(No Model.)
F. R. McMILLAN.
TUBE VALVE.
No. 509,670.
Patented Nov. 28, 1893.
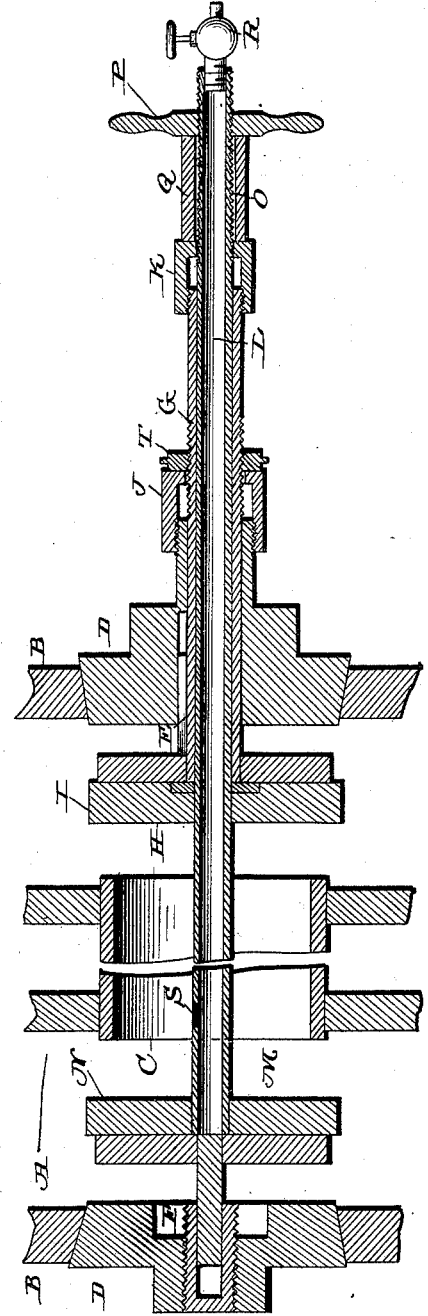
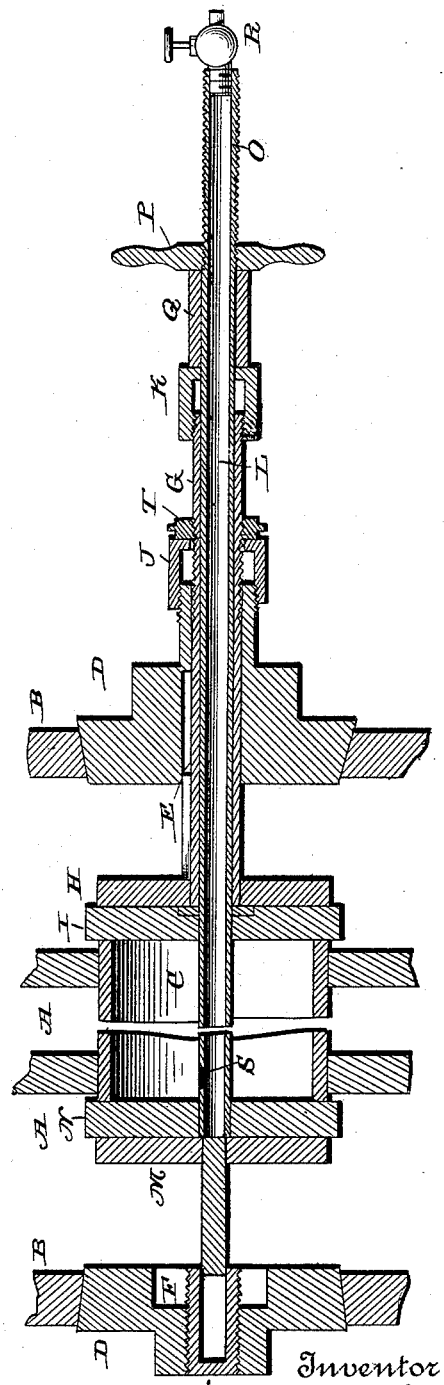

UNITED STATES PATENT OFFICE.

FREDERICK ROUTT McMILLAN, OF JACKSONVILLE, ILLINOIS.

TUBE-VALVE.

SPECIFICATION forming part of Letters Patent No. 509,670, dated November 28, 1893.

Application filed July 11, 1893. Serial No. 480,166. (No model.)

*To all whom it may concern:*

Be it known that I, FREDERICK ROUTT MC-MILLAN, a citizen of the United States, residing at Jacksonville, in the county of Morgan and State of Illinois, have invented certain new and useful Improvements in Tube-Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a tube valve or device for cutting off the flow of water to a steam boiler water tube when the same begins to leak and it consists in certain novel features hereinafter described and claimed.

In the annexed drawings, which fully illustrate my invention, Figure 1 is a longitudinal sectional view of the device in its operative position, showing the tube open, and Fig. 2 is a similar view showing the tube closed.

Referring to the drawings by letter, A B designate the inner and outer walls or sheets of the water drum of a steam boiler and C designates a water tube, all of which are of the usual construction.

In the outer walls or sheets, B, of the water drum, opposite the ends of the tubes, I secure the plugs or bearings D which are provided with water-tight joints as will be readily understood. The front plug is provided with a central axial passage or opening E while the rear plug or bearing is provided with a central socket or recess F in its inner face, as shown. A hollow stem, G, is mounted in the front bearing or plug D and extends through the same, having a valve disk H secured to its inner end which is adapted to cover the front end of the water tube and close the same. This valve disk is provided with an asbestus facing I so as to form a water tight and fire-proof joint with the end of the tube when turned up against the same. The front end of the hollow stem passes through a stuffing box J on the outer side of the plug or bearing and is secured in a stuffing box K which is mounted on a second inner stem L. This inner stem, L, passes through the outer stem and the water tube and has a disk valve M secured to its rear end which is adapted to close the rear end of the tube and is provided with an asbestus facing N. Projecting from the rear end of the inner stem is a supplemental angular stem or guide which enters and plays in the central recess or socket of the rear plug and thereby serves to maintain the inner stem in its proper position centrally of the water tube. The outer end of the inner stem projects beyond the stuffing box K and has a screw-threaded portion O upon which an operating nut or handle P is mounted, a sleeve Q being arranged between the said nut or handle and the stuffing box K and bearing against the same, as clearly shown. The outer extremity of the inner stem is provided with a valve or cock R and the inner end thereof, adjacent to the inner valve is provided with an escape port S. A nut T is mounted on the inner stem and bears against the box J as shown, the said inner stem being keyed in the plug to prevent its rotation.

The construction and arrangement of the several parts of the device being thus made known, it is thought the operation and advantages of the same will be readily comprehended. Each tube is fitted with these valves and normally the valves are drawn away from the ends of the tube thus permitting the free circulation of the water into and through the same. Should any tube, however, be burned through or worn away so as to leak, the nut or handle P in the front of that tube is rotated thereby bringing the valves up against the ends of the tube and consequently shutting off the water therefrom. After the valves have been turned up against the ends of the tube, the cock or valve at the outer end of the inner stem is opened and the water in the tube will then escape through the opening S and the said cock or faucet, thus preventing damage to the tube from over pressure therein. The defective tube will thus be cut off without necessitating a stopping of the engine or in any way affecting the other tubes. The furnace can consequently be operated until the fires can be extinguished without detriment or serious loss and the tube then repaired. When the handle P is rotated in the reverse direction the inner stem will be moved so as to carry the rear valve away from the boiler tube but in order to move the front valve away from the boiler tube it will be necessary to rotate the nut T as will be readily understood.

The device is very simple in its construction and its advantages are thought to be obvious.

Having thus described my invention, what I claim, and desire to secure by Letters Patent, is—

1. The combination with the drum and water tube, of hollow stems mounted in the wall of the drum and adapted to slide therethrough, valves secured to said stems and adapted to fit over and close the opposite ends of the tube, and mechanism for operating said stems.

2. The combination with the drum and water tube, of a sliding stem supported by the drum and having an opening near its inner end and a cock or valve at its outer end, and a disk valve secured to the inner end of the stem and adapted to close the inner end of the tube.

3. The combination with the water drum and water tube, of plugs or bearings secured in the walls of the drum, hollow sliding stems mounted in the front plug or bearing, valves secured on said stems and adapted to close the opposite ends of the tube, a guide or supplemental stem secured to the rear end of the inner stem and engaging a central socket in the rear plug, and means for operating said stems.

In testimony whereof I affix my signature in presence of two witnesses.

FREDERICK ROUTT McMILLAN.

Witnesses:
JAMES T. McMILLAN,
DAN. E. PIERSON.